US009769701B2

United States Patent
Denio et al.

(10) Patent No.: US 9,769,701 B2
(45) Date of Patent: Sep. 19, 2017

(54) HEADER COMPRESSION FOR WIRELESS BACKHAUL SYSTEMS

(71) Applicant: Texas Instruments Incorporated, Dallas, TX (US)

(72) Inventors: Michael A. Denio, Allen, TX (US); Pierre Bertrand, Antibes (FR); Brian J. Karguth, Van Alstyne, TX (US); David J. Halliday, Leicestershire (GB)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 217 days.

(21) Appl. No.: 14/302,883

(22) Filed: Jun. 12, 2014

(65) Prior Publication Data

US 2014/0369365 A1 Dec. 18, 2014

Related U.S. Application Data

(60) Provisional application No. 61/835,353, filed on Jun. 14, 2013.

(51) Int. Cl.
*H04W 28/06* (2009.01)
*H04L 29/06* (2006.01)

(52) U.S. Cl.
CPC ............ *H04W 28/06* (2013.01); *H04L 69/04* (2013.01); *H04L 69/16* (2013.01); *H04L 69/22* (2013.01)

(58) Field of Classification Search
None
See application file for complete search history.

(56) References Cited

U.S. PATENT DOCUMENTS

| 2005/0271033 | A1* | 12/2005 | Nakash | H04L 69/04 370/349 |
| 2007/0086456 | A1* | 4/2007 | Kim | H04L 47/10 370/389 |
| 2008/0098129 | A1* | 4/2008 | Niddam | H04L 69/04 709/247 |
| 2010/0208749 | A1* | 8/2010 | Chun | H04L 69/22 370/474 |
| 2013/0182640 | A1* | 7/2013 | Liu | H04W 28/06 370/328 |

* cited by examiner

*Primary Examiner* — Kouroush Mohebbi
(74) *Attorney, Agent, or Firm* — Ronald O. Neerings; Charles A. Brill; Frank D. Cimino

(57) ABSTRACT

Systems and methods for header compression are described. In various implementations, these systems and methods may be applicable to wireless backhaul systems. For example, a method may include receiving a packet at a backhaul modem from an Ethernet switch, the packet having an uncompressed header comprising a concatenation of at least an Ethernet and an Internet Protocol (IP) header, and a payload; parsing the uncompressed header into a plurality of fields, the plurality of fields including a static field and a derivable field; removing the static field and the derivable field from the uncompressed header; adding a compressed field to the uncompressed header to create a compressed header; and transmitting the packet with the compressed header and the payload over a wireless link.

20 Claims, 9 Drawing Sheets

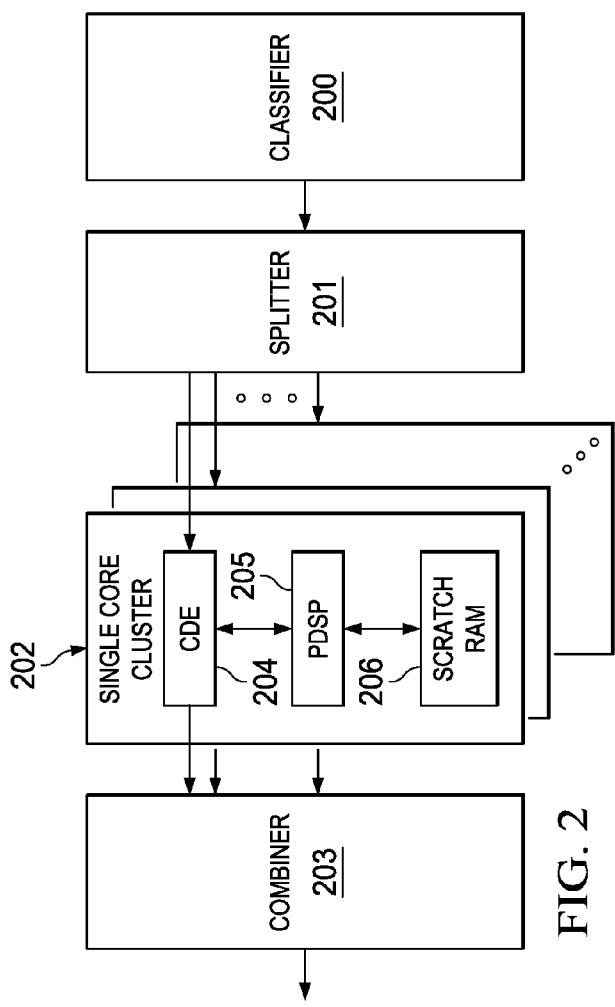
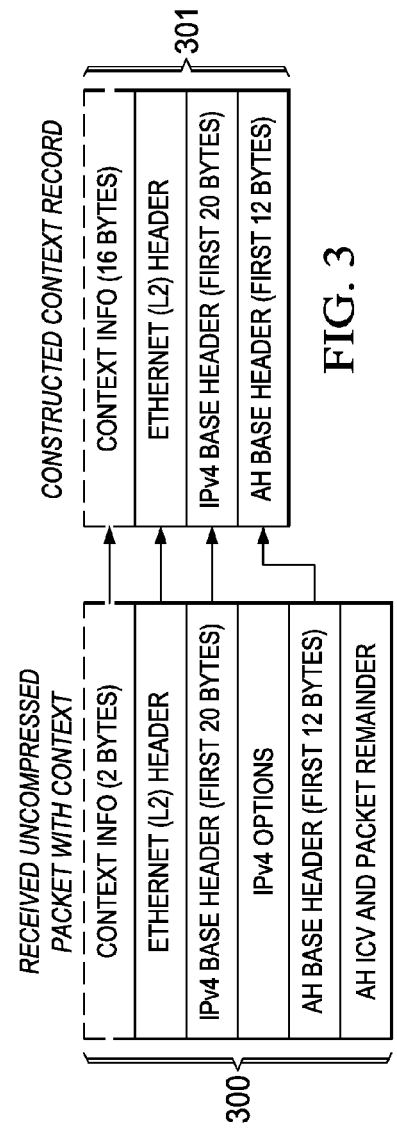

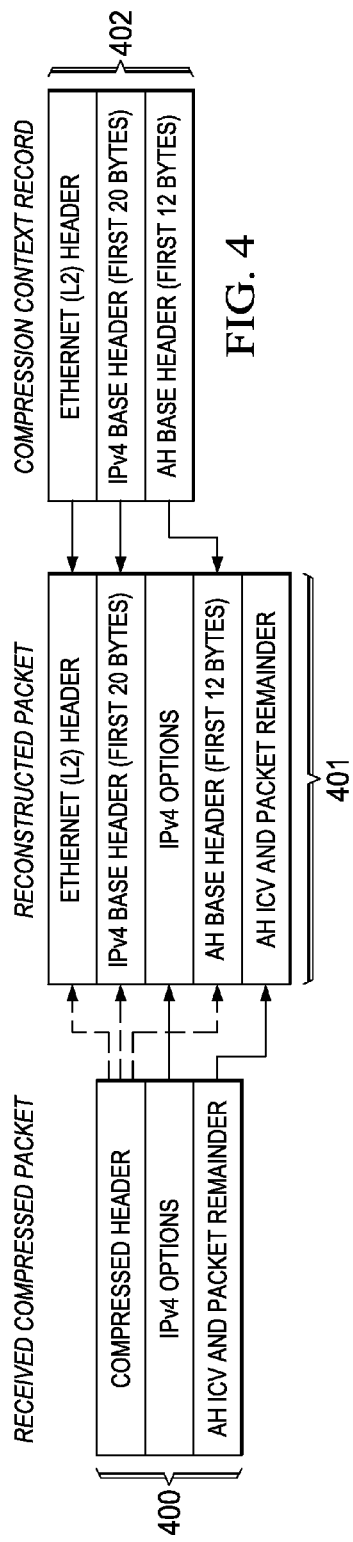
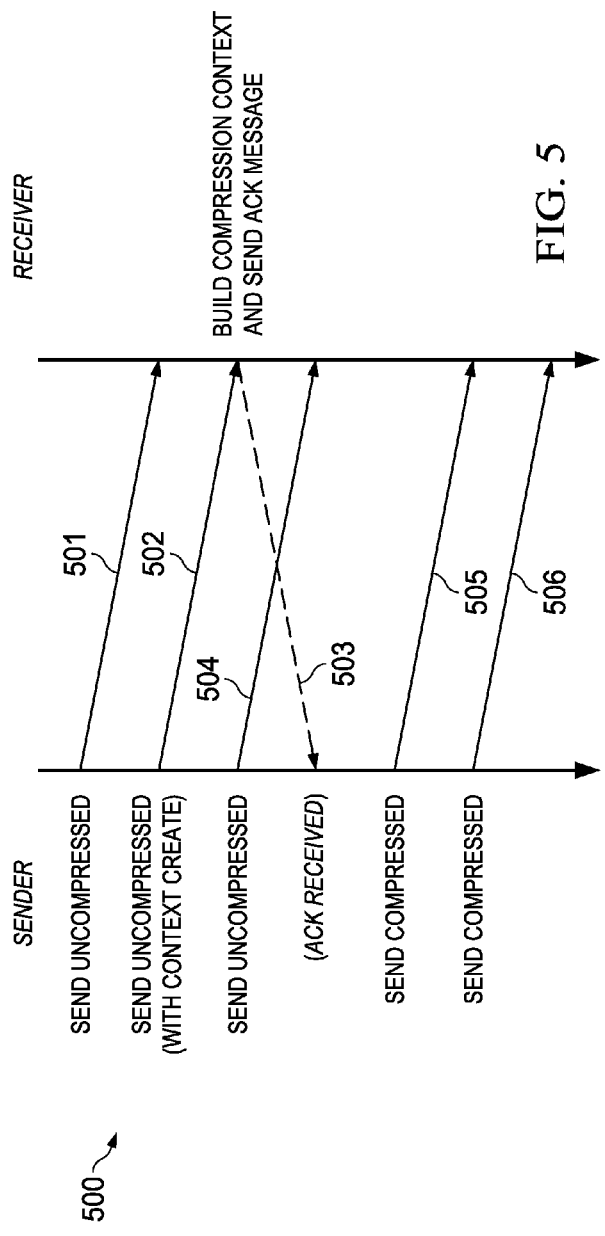

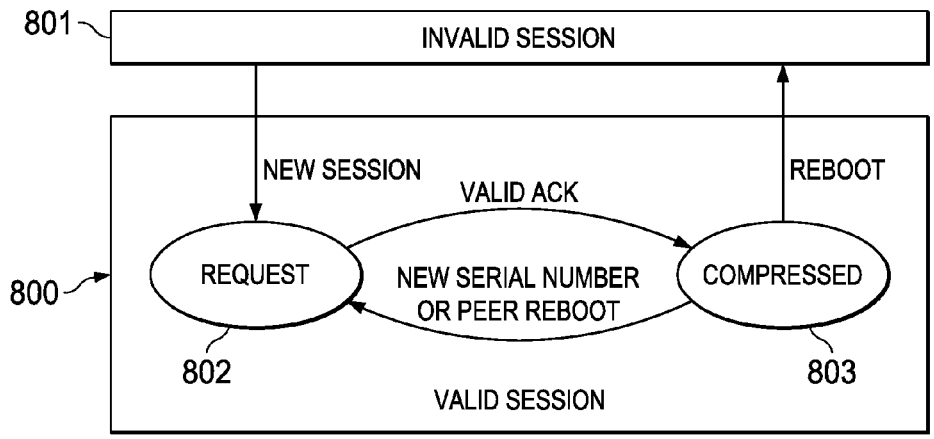
FIG. 8
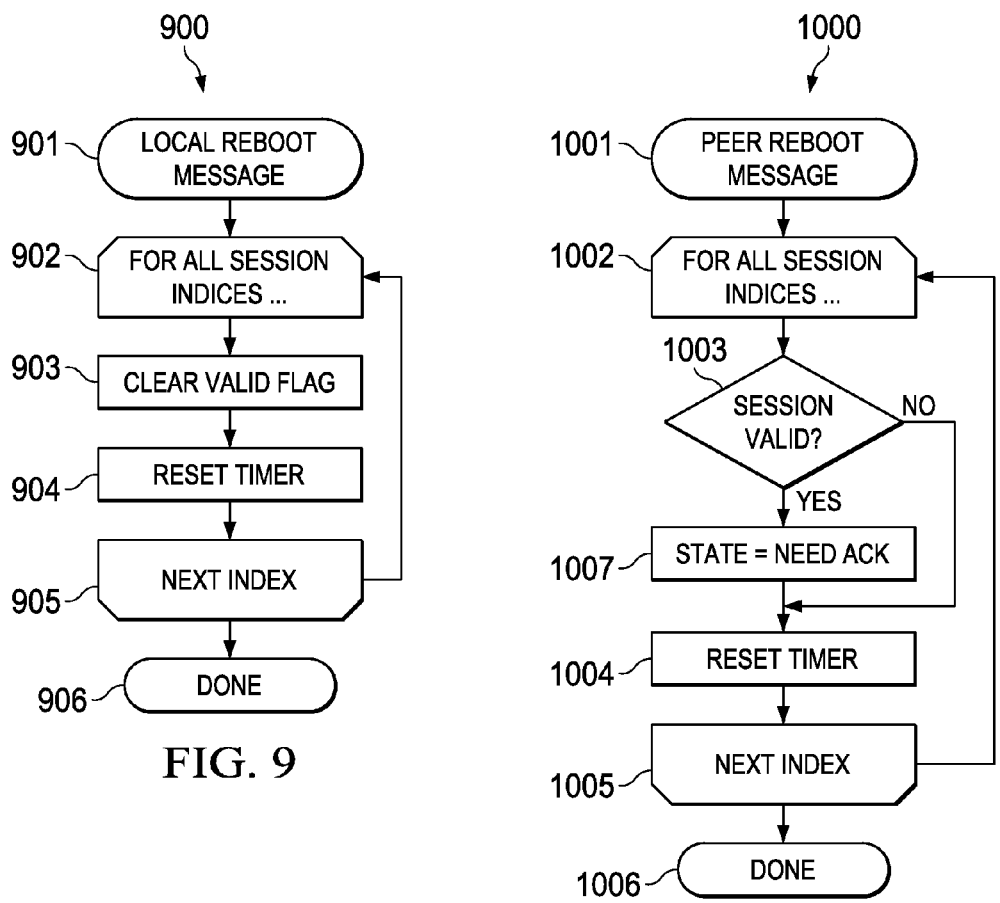
FIG. 9
FIG. 10

HEADER COMPRESSION FOR WIRELESS BACKHAUL SYSTEMS

CROSS-REFERENCE TO RELATED APPLICATIONS

This application claims the benefit of the filing date of U.S. Provisional Patent Application No. 61/835,353 titled "Header Compression for Wireless Backhaul Systems" and filed on Jun. 14, 2013, the disclosure of which is hereby incorporated by reference herein in its entirety.

TECHNICAL FIELD

This specification is directed, in general, to network communications, and, more specifically, to systems and methods for header compression for wireless backhaul systems.

BACKGROUND

Several Internet Protocol (IP) header compression techniques exist and are deployed in today's networks. Examples of those techniques include the IP Header Compression (IPHC) published as Network Working Group's Request for Comments (RFC) 2509, the Robust Header Compression (ROHC) published as RFC 4995, and the EthHC™ published by Effnet AB. The first two address L3/L4 header compression, whereas the third one addresses Ethernet (L2) header compression. Both IPHC and ROHC aim at being as generic or exhaustive as possible while claiming a potentially high compression rate. As a result, they require high complexity, high level of configurability and adaptation, and feedback channel to address unreliable wireless channels. Also, the functionality addresses both flow detection/identification and compression. Finally, a major drawback is the need to concatenate two independent header compression mechanisms in order to compress both the L3/L4 and L2 headers.

To address these, and other shortcomings of existing header compression techniques, the inventors hereof have developed a comprehensive L2/L3/L4 compression mechanism with the goal to increase or maximize efficiency and to reduce or minimize complexity when implemented on a high rate wireless backhaul link.

SUMMARY

Systems and methods for header compression for wireless backhaul systems are described. In an illustrative, non-limiting embodiment, a method may include receiving a packet at a backhaul modem from an Ethernet switch, the packet having an uncompressed header comprising a concatenation of at least an Ethernet and an Internet Protocol (IP) header, and a payload; parsing the uncompressed header into a plurality of fields, the plurality of fields including a static field and a derivable field; removing the static field and the derivable field from the uncompressed header; adding a compressed field to the uncompressed header to create a compressed header; and transmitting the packet with the compressed header and the payload via a wireless link.

In some implementations, the static field may include at least one of: a source IP address, a destination IP address, or a Media Access Control (MAC) address. The derivable field may include at least one of: a checksum field or a length field. The compressed field may include a common header, the common header configured to identify each transmitted packet as a peer control packet, an uncompressed packet, a compressed packet, or an uncompressed packet with a compression tag. The common header may include a session index. The session index may be configured to identify one of a plurality of different packet flows.

The common header may identify the packet as an uncompressed packet with a compression tag, and it may also be configured to signal a request to another backhaul modem to create a new decompression session based upon the packet. The common header may include a session index, a serial number, and a depth indicator. The serial number may allow the other backhaul modem to reconfigure a session index with a different packet flow than a current packet flow. The depth indicator may be configured to convey a compression depth, the compression depth comprising: an L2 layer, up to an L3 layer, or up to an L4 layer. The depth indicator may be configured to enable the other backhaul modem to create a compression context at a selected compression depth.

The method may also include receiving the session index and the serial number from the other backhaul modem as part of an acknowledgment message. The method may further include identifying the packet as belonging to a packet flow that is a candidate for compression and for which a corresponding compression context already exists; and retrieving the compressed header associated with the corresponding compression context.

The method may also include identifying the packet as belonging to a packet flow that is a candidate for compression but for which a corresponding compression context does not yet exist; and creating the compression context for the packet flow, where the corresponding compression context includes the static field and an indication of the derivable field, and where the corresponding compression context is associated with the compressed header. The method may further include receiving the packet over the wireless link with the compressed header and the payload; identifying one of a plurality of compression contexts that corresponds to the compressed header; retrieving the static field and computing the derivable field associated with the corresponding compression context; and replacing the compressed header with the static field and the derivable field to reconstruct the uncompressed packet.

In another illustrative, non-limiting embodiment, a backhaul modem may include a processor and a memory coupled to the processor, the memory configured to store program instructions executable by the processor to cause the device to: receive an ingress packet from an Ethernet switch via a wireless backhaul link, wherein the packet includes an uncompressed header, and wherein the packet belongs to a given one of a plurality of different packet flows; add a context create tag to the packet to create a tagged packet in response to a determination that the given packet flow is suitable for compression; transmit the tagged packet to a receiver device via a wireless link; receive an acknowledgment from the receiver device via the wireless link, where the acknowledgement is configured to indicate that the receiver device has built a compression context associated with the given packet flow in response to having received the tagged packet; and transmit a subsequent packet of the given packet flow to the receiver device in a compressed state.

The packet may be an Ethernet packet having a static field and a derivable field, where the subsequent packet in the compressed state does not have the static field or the derivable field, where the static field includes at least one of: a source IP address, a destination IP address, or a MAC address, where the derivable field includes at least one of:

checksum field or an Ethertype field, and where the compression context includes the static field and an indication of the derivable field. The context create tag may include a session index, a serial number, and a depth indicator, where the session index is configured to identify the given one of the plurality of different packet flows, where the serial number is usable to reconfigure sequentially the same session index with different packet flows, and where the depth indicator is configured to convey a compression depth, the compression depth comprising: an L2 layer, up to an L3 layer, or up to an L4 layer. The program instructions may be executable by the processor to cause the device to transmit another packet belonging to the given packet flow to the receiver device in an uncompressed state prior to having received the acknowledgement.

In yet another illustrative, non-limiting embodiment, a non-transitory electronic storage medium may have program instructions stored thereon that, upon execution by a processor of a device, cause the device to: receive a packet from a backhaul modem device via a wireless backhaul link, where the packet belongs to a given one of a plurality of different packet flows suitable for compression, where the packet includes an uncompressed header, where the packet is an Ethernet packet having a static field and a derivable field, where the static field includes at least one of: a source IP address, a destination IP address, or a MAC address, where the derivable field includes at least one of: a checksum field or an Ether type field, and where the packet includes a context create tag; create a compression context associated with the given packet flow in response to the context create tag, where the compression context includes the static field and an indication of the derivable field; transmit an acknowledgment to the backhaul modem, where the acknowledgement is configured to indicate that the compression context has been built; and receive a subsequent packet of the given packet flow in a compressed state, where the subsequent packet in the compressed state does not have the static field or the derivable field.

In some embodiments, one or more communications devices or computer systems may perform one or more of the techniques described herein. In other embodiments, a tangible computer-readable or electronic storage medium may have program instructions stored thereon that, upon execution by one or more communications devices or computer systems, cause the one or more communications devices or computer systems to execute one or more operations disclosed herein. In yet other embodiments, a communications system (e.g., a device or modem) may include at least one processor and a memory coupled to the at least one processor. Examples of a processor include, but are not limited to, a digital signal processor (DSP), an application specific integrated circuit (ASIC), a system-on-chip (SoC) circuit, a field-programmable gate array (FPGA), a microprocessor, or a microcontroller. The memory may be configured to store program instructions executable by the at least one processor to cause the system to execute one or more operations disclosed herein.

BRIEF DESCRIPTION OF THE DRAWINGS

Figure 1:
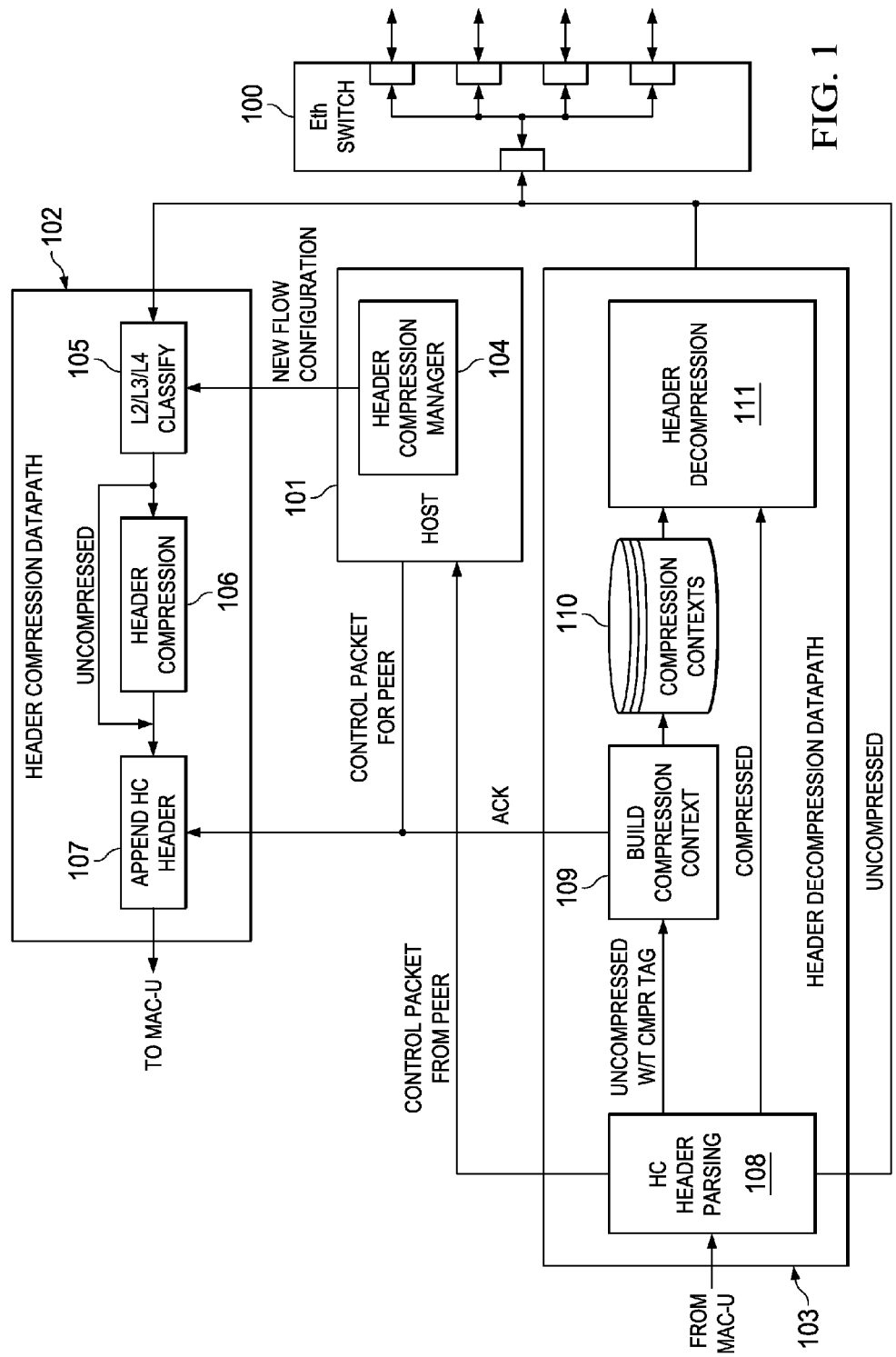

Having thus described the invention(s) in general terms, reference will now be made to the accompanying drawings, wherein:

FIG. 1 is a block diagram of a header compression function of a wireless backhaul modem according to some embodiments.

FIG. 2 is a block diagram of an implementation of a Header Compression/Decompression datapath according to some embodiments.

FIG. 3 is a diagram of a received uncompressed packed with context and a constructed context record according to some embodiments.

FIG. 4 is a diagram of a reconstruction process according to some embodiments.

FIG. 5 is a diagram illustrating compression tag transmission and acknowledgement according to some embodiments.

Figure 6:
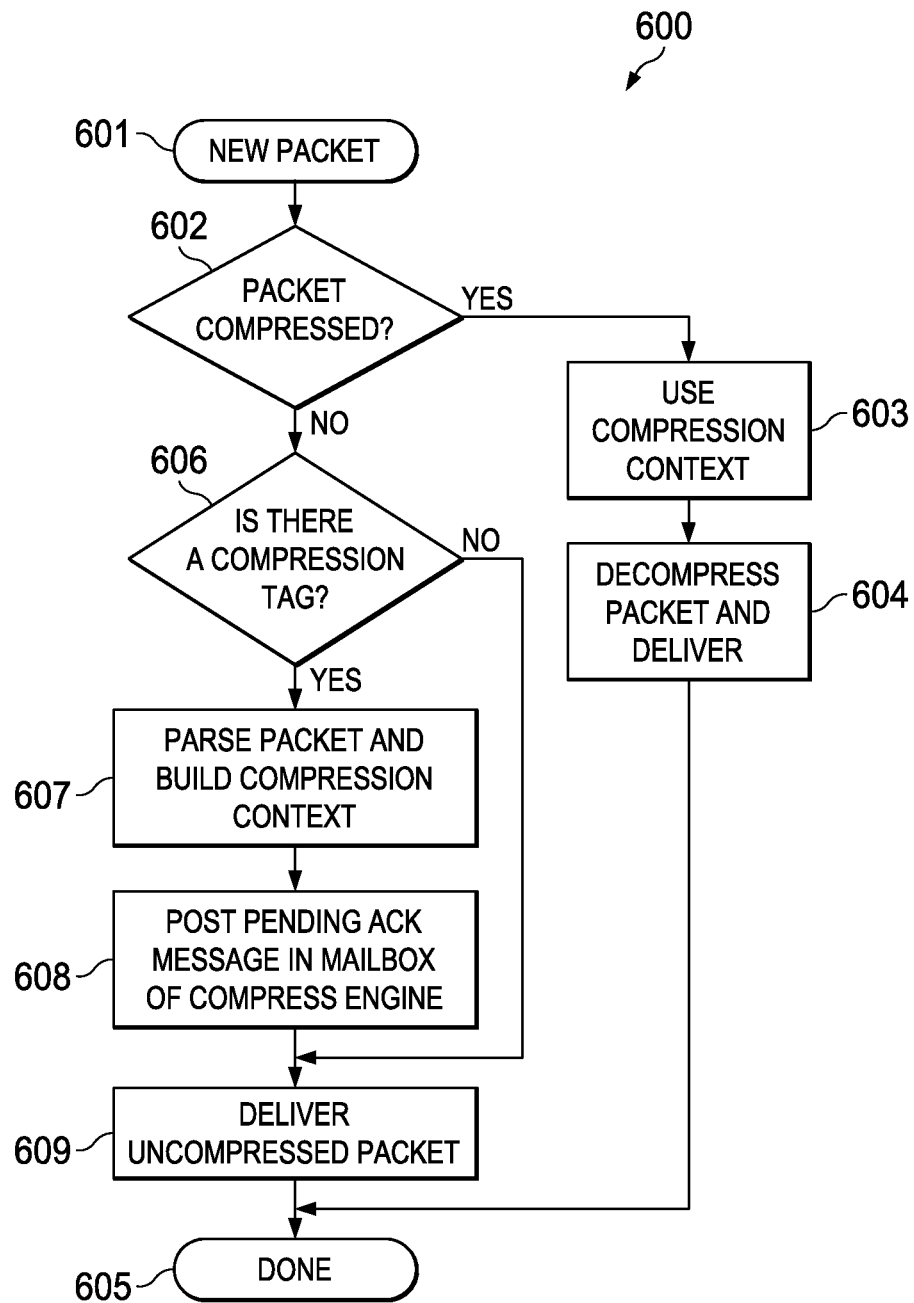

FIG. 6 is flowchart of a method for decompressing a packet header according to some embodiments.

Figure 7:
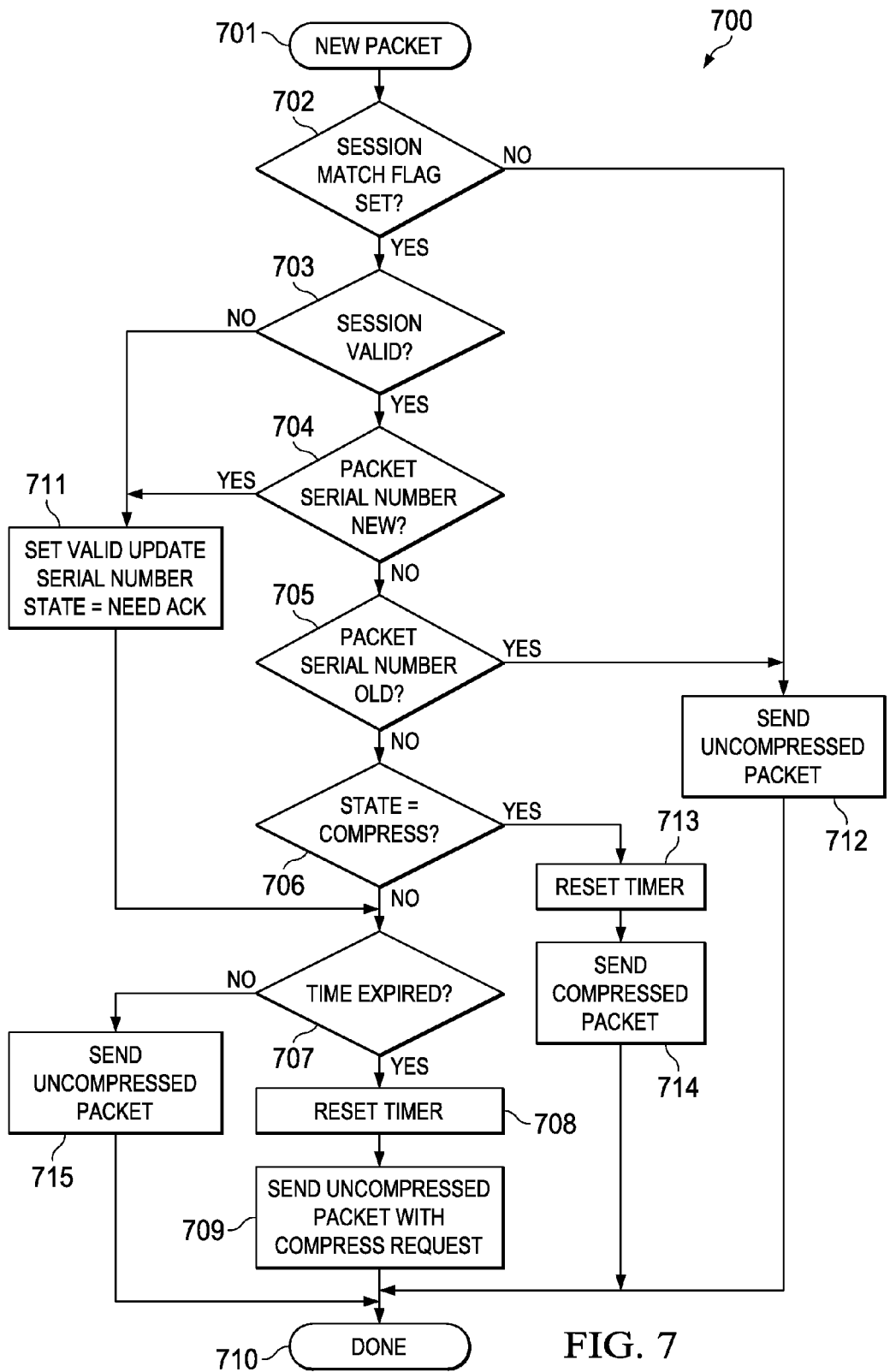

FIG. 7 is flowchart of a method for compressing a packet header according to some embodiments.

FIG. 8 is a diagram of a state machine according to some embodiments.

FIG. 9 is a flowchart of a local system reboot process according to some embodiments.

FIG. 10 is a flowchart of a lost link or peer reboot process according to some embodiments.

Figure 11:
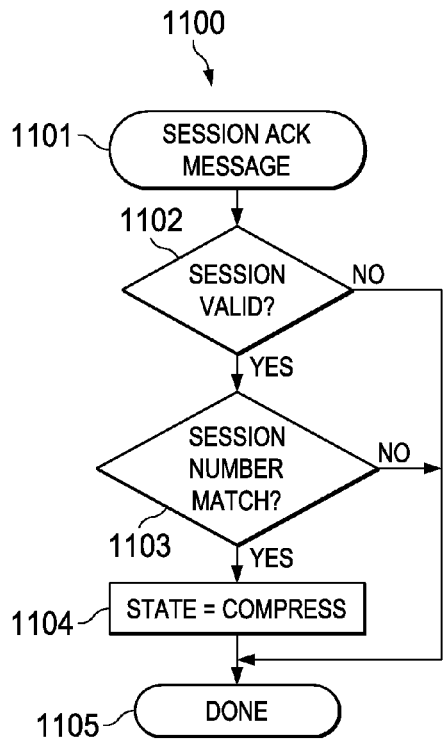

FIG. 11 is a flowchart of a peer acknowledgement of compression request process according to some embodiments.

Figure 12:
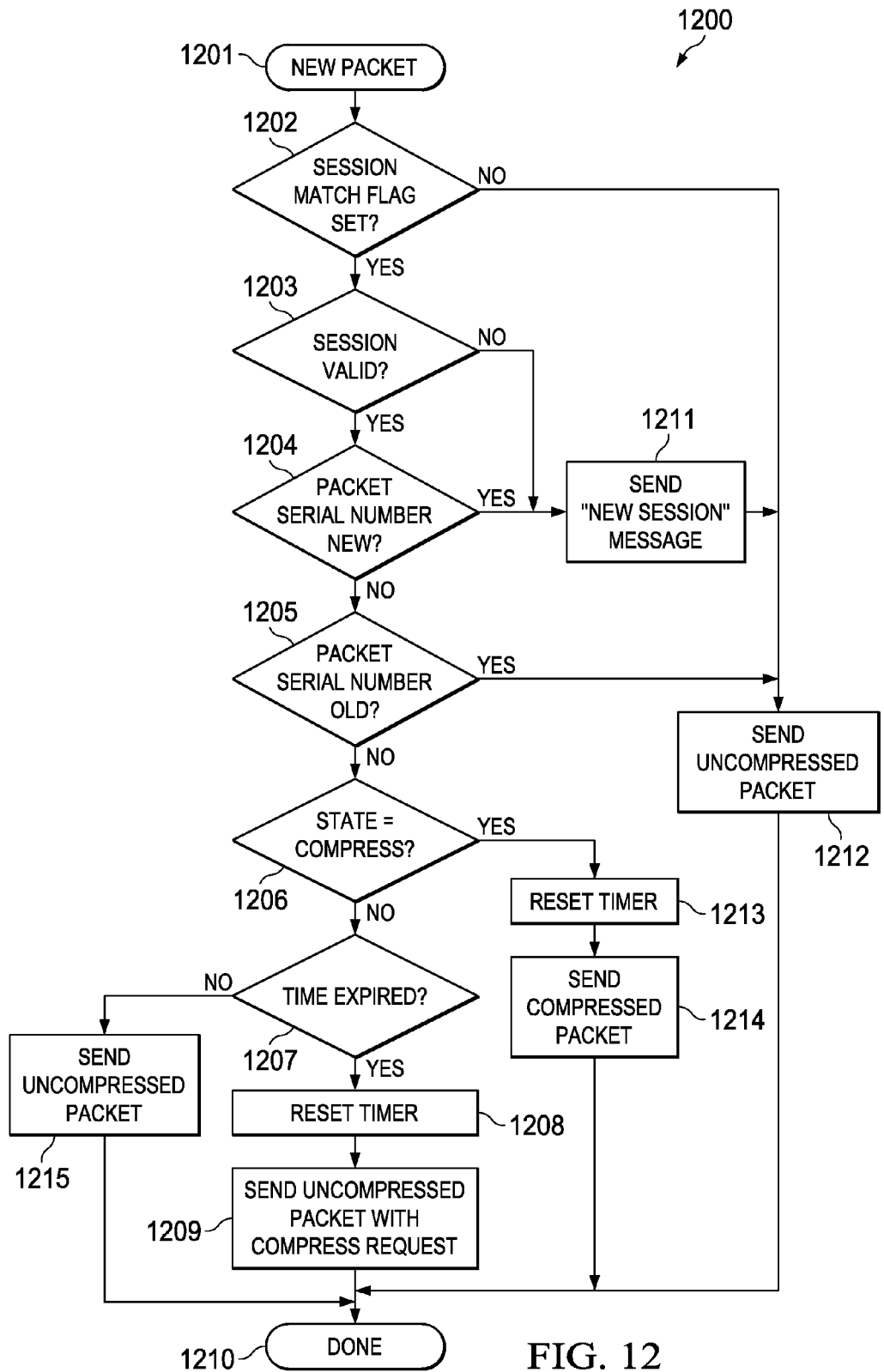

FIG. 12 is a flowchart of an alternative method for compressing a packet header according to some embodiments.

Figure 13:
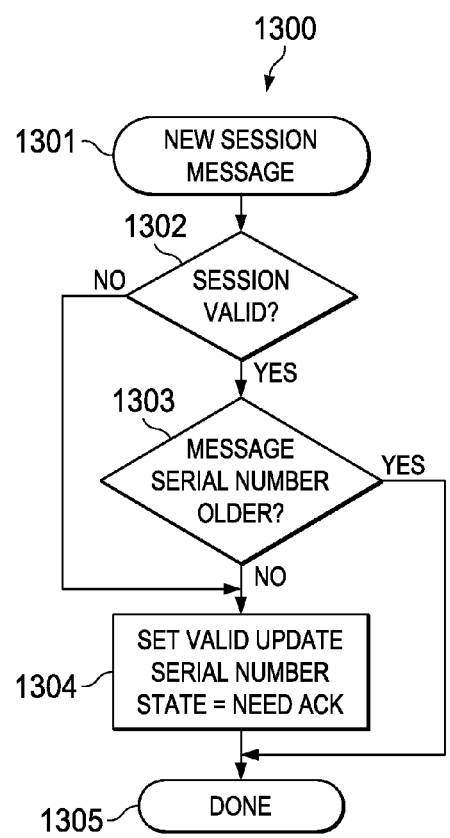

FIG. 13 is a flowchart for a new session message handling method according to some embodiments.

Figure 14:
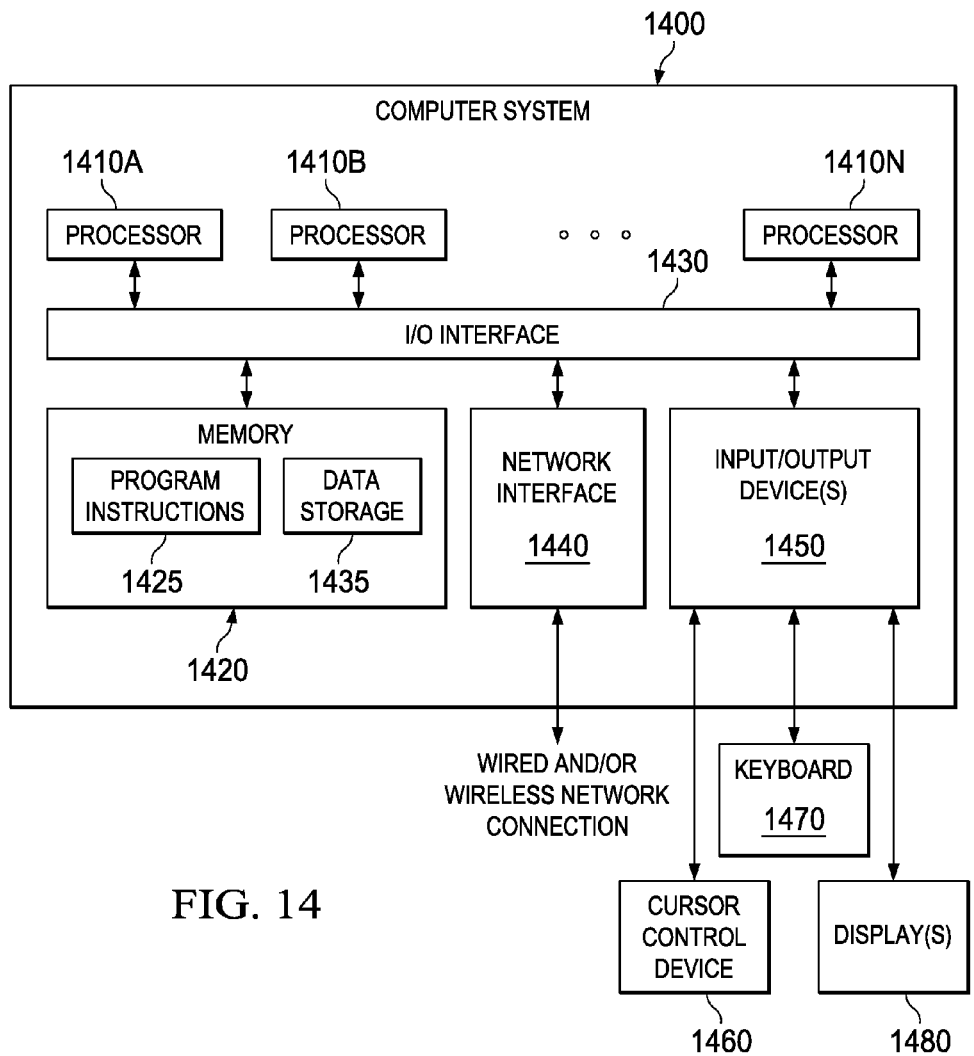

FIG. 14 is a block diagram of a device configured to implement certain systems and methods described herein according to some embodiments.

DETAILED DESCRIPTION

The invention(s) now will be described more fully hereinafter with reference to the accompanying drawings. The invention(s) may, however, be embodied in many different forms and should not be construed as limited to the embodiments set forth herein. Rather, these embodiments are provided so that this disclosure will be thorough and complete, and will fully convey the scope of the invention(s) to a person of ordinary skill in the art. A person of ordinary skill in the art may be able to use the various embodiments of the invention(s).

In various implementations, the systems and methods described herein may be used to define a comprehensive L2/L3/L4 compression mechanism with the goal to maximize the efficiency and minimize the complexity when implemented on a high rate wireless backhaul link. These systems and methods describe the operation and data formats used by the proposed packet header compression function optimized for wireless backhaul transmissions in point-to-point (P2P) and point-to-multipoint (P2MP) topologies.

As a person of ordinary skill in the art will recognize in light of this disclosure, although the header compression techniques discussed herein may be applied to other wireless data transmission systems, they are particularly designed for wireless backhaul systems serving macro and small cells base stations of cellular networks. In some cases, packet header compression may provide 10-30% throughput savings in wireless backhaul systems, and therefore it is expected to become a must-have feature in new generations of wireless backhaul modems. For example, these techniques may be configured to sustain 10 Gb/s throughput with packet rates of 20 Mpps.

Generally speaking, packet header compression is designed to increase the relative bandwidth of a network link by eliminating the redundant information that occurs in sequential packets of the same network flow. Design objectives may include increasing radio bandwidth performance by using fewer bytes to transmit packet data, compressing packet headers by suppressing static or derived fields for a given session, assuming most traffic is encrypted and concentrate on L2, L3, and IPSEC (can be adjusted or expanded as compression engines are "soft"), and introducing as little overhead as possible when synchronizing compression contexts.

The compression systems described herein are designed to be both lightweight and dynamic. Although these systems are capable of handling static compression sessions, there is also an emphasis on stressing the dynamic nature of packet compression, which assumes that sessions may be created and destroyed at a relative high frequency.

Thus, in addition to the aforementioned design objectives, the compression techniques described herein may also not expand the size of packet that cannot be compressed any more than necessary, may keep the system fast and simple, may not overburden the system with compression session creation (creating and destroying a session for even a single compressed packet should yield a bandwidth gain), and may keep the compression context stateless to avoid any requirement to update or repair contexts after establishment.

Table I below illustrates the potential gain observed by simple compression of common network headers. It should be noted that the a software or firmware implementation of the systems and methods described herein allows the addition of different header types in a modular fashion.

TABLE I

| Header | Typical Original Size | Typical Compressed Size | Bytes Saved |
|---|---|---|---|
| Ethernet Header | 14 | 2 | 12 |
| Ethernet CRC | 4 | 0 | 4 |
| IPv4 | 20 | 3 | 17 |
| IPv6 | 40 | 0 | 40 |
| AH | 12 (initial header) | 6 | 6 |
| ESP | 8 (initial header) | 4 | 4 |
| Total IPv4/AH | ~66 | ~27 | 39 |
| Total IPv4/ESP | ~64 | ~27 | 37 |
| Total IPv6/AH | ~86 | ~24 | 62 |
| Total IPv6/ESP | ~84 | ~24 | 60 |

As an example of savings afforded by the header compression techniques described below, take the processing of a smallest Encapsulating Security Payload (ESP) packets. Assume a minimum size tunneled packet on IPv4/ESP, for example, a TCP ACK. The payload would be a 20 byte IPv4 header, plus a 20 byte TCP header. These 40 bytes would then be padded out to the encryption block length (assume 16 bytes), making the total payload 48 bytes. The total packet (headers+payload) would be ~114 bytes, with a transmitted size of ~77 bytes, which results in a savings of 33%.

Architecturally, the systems and methods described herein may be implemented, at least in part, as a compression solution within a backhaul modem device or the like. There are three pieces to the compression solution: a Classifier and Session Lookup module, a Compression Engine, and a Decompression Engine. The Classifier and Compression Engine reside on the sending peer. The Decompression Engine resides on the receiving peer. The solution is symmetrical, so both peers have at least one of each component.

Turning now to FIG. 1, a block diagram of a header compression function of a wireless backhaul modem is depicted according to some embodiments. Particularly, the block diagram may be split in two main components: Header Compression Manager 101, which runs header compression manager software 104 on a host (e.g., a processor-based system), and header Compression/Decompression Datapaths 102 and 103. Header Compression Manager 101 is responsible for detecting and creating new compression contexts, and may be configured by the user to meet its particular design requirements. Ethernet switch 100 is shown to illustrate that current and future generations of backhaul modems receive and send IP packets transported in Ethernet frames or packets.

FIG. 2 is a block diagram showing an implementation of the Header Compression and/or Decompression datapaths 102-103 of FIG. 1, which in some embodiments may involve a mixture of hardware and software (e.g., firmware) components. The latter is key in allowing upgrading the functionality quickly. Compression block 202 may be used as Header Compression block 106 and Append module 107 and/or Header Decompression block 111, and classifier 200 may be used as classifier block 105.

As shown, single core cluster 202 includes compression hardware (CDE) 204, a programmable digital signal processor (PDSP) core 205, and some scratch memory 202. Depending on throughput requirements, a number of compression blocks may be used as parallel processing chains. Packets are distributed across the compression blocks by splitter 201 and further combined into a single flow by Combiner 203. Further ahead, classification engine 200 performs the configured session matching and prepares the packets delivered to cluster 202.

Referring to FIGS. 1 and 2, with respect to Header Compression Datapath 102, classifier 105 extracts fields from an ingress packet to submit to a lookup engine. Information that is critical to the compression is also extracted and saved at this stage, so that the compression engine does not need to reclassify the packet. When a lookup table (LUT) match is found, the match index is passed to compression engine 106. In some cases, a few more bytes of information may also be passed (e.g., compression depth), but this may be able to be derived independently. If implementing dynamic compression context sessions, the LUT may add an entry on a failed lookup. Additional usage bookkeeping (either in the LUT or in the classifier) may dynamically create new compression sessions based on use thresholds.

Tracking changes in static fields may be left entirely to classifier 105. In other words, a "session match" at the compressor input means all static fields values match with those expected. This means that the header compression manager defines/configures a session in the classifier with not only the Media Access Control (MAC)/Internet Protocol (IP) source/destination addresses and Ethertype, but also with all static fields' values. As soon as one static field value changes, the packet is not considered as a session match and is delivered as such to the compressor, which forwards it uncompressed. This is the simplest approach for the compressor that never needs to keep track of the static fields, but just drops them.

The packet compression operation performed by block 106 is charged with removing static data from the packet and replacing it with a compressed header containing information that is not compressible or otherwise derivable. The system is designed to allow for both IP options on IPv4 packets, as well as optional headers on IPv6 packets.

Options and optional headers are not assumed to be consistent and are not compressed. Because of this, there may be a mix of compressed and uncompressed data spread across the packet. For example, an original packet may be as shown in Table II:

TABLE II

Ethernet (L2) Header
IPv4 Base Header (first 20 bytes)
IPv4 Options
AH Base Header (first 12 bytes)
AH ICV and Packet Remainder After the same packet is compressed, it may be as show in Table III:

TABLE III

Compressed Header
IPv4 Options
AH ICV and Packet Remainder

Packet decompression block 111 relies on local compression context 110. This context is created and stored by block 109 of the decompress engine using an uncompressed packet belonging to the targeted network flow and parsed by HC header parsing block 108.

Compression context database 110 contains the static versions of the original packet headers. When the compression context is first created, the static data is copied from the source packet to the compression context. When a compressed packet is later decompressed, this static data is inserted to the packet, and the non-static fields are patched based on the information in the compressed header. Referring to FIG. 3, received uncompressed packed with context 300 is depicted along with a constructed context record 301, such that all static information from the uncompressed packet 300 is retained in record 301.

The packet is decompressed by reversing the process used to compress the packet. Specifically, the static headers are extracted from the stored compression context 110 and reinserted into the packet. Then, the compressed header on the packet is decoded to perform the necessary patching of the static data to match the original packet. FIG. 4 is a diagram of a reconstruction process according to some embodiments. Particularly, FIG. 4 shows elements of received compressed packet 400, compression context record 402, and the resulting reconstructed packet 401.

One of the advantages of this approach described above is the simplicity of synchronization. Once a packet is received for a new compression session, the compressor marks it with a special code that informs the peer as to how the packet will be compressed once the session has been synchronized. This may be done, for example, via a two byte header on the packet (one additional byte as compared to a traditional uncompressed packet) containing a compression tag. In some cases, the compress engine will not start compressing packets until the compression tag has been acknowledged by the peer.

The aforementioned compression tag may contain the following information: packet header type (code to indicate compression tagged packet), 3-bit compression session serial number, 2-bit compression depth indication, and 8-bit compression session index. The serial number of the tag allows tags to be reused by the compress engine up to 7 times without receiving any acknowledgement from the peer for any of them. It is highly unlikely that this would occur, but if it does, the session index may be retired until the next system synchronization opportunity.

FIG. 5 shows method 500 for compression tag transmission and acknowledgement according to some embodiments. Particularly, a sender transmits an uncompressed packet at 501 to a receiver. In some cases, the first packet may belong to a packet flow or session that is not a candidate for header compression. Then, the sender may transmit another uncompressed packet at 502 to the sender, for example, as part of a packet flow or session that is a candidate for compression. Accordingly, the other packet may include a context create tag or the like.

In response to the context create or compression tag, the receiver may create a context for the corresponding packet flow and may transmit an acknowledgement message back to the sender at 503. If another packet from the same packet flow is transmitted by the sender at 504 prior to the sender having received the acknowledgement message, that packet is also transmitted uncompressed. Upon having received the acknowledgement, however, the sender may subsequently transmit compressed packets to the receiver at 505 and 506.

It should be noted that no handshake is required to destroy a compression context. When the context expires, the compress engine simply stops using it. When a new context is created using the same session context index, the serial number associated with the index in incremented to avoid confusion on the decompress engine, and a new context creation tag is transmitted for the index. The decompress engine then knows to overwrite the expired context with the new information.

In some embodiments, the firmware implemented in FIGS. 1 and 2 may be configured to handle the following header types: Ethernet (with or without VLANs), IPv4, IPv6, IPSEC AH, and/or IPSEC ESP. To illustrate the effects of these compression techniques on these various header types, Tables IV-XII show individual header fields of uncompressed packets and their corresponding compressed versions.

Table IV shows an uncompressed Ethernet (L2) header. Every field in the L2 header is constant, and thus trimmed in its entirety from the compressed packet.

TABLE IV

| Destination MAC | | |
|---|---|---|
| Destination MAC | | Source MAC |
| | Source MAC | |
| 0x8100 | | VLAN |
| EtherType | | |

Again, because the Ethernet header is considered to be entirely static, there is no compressed Ethernet header per se. There is a 2-byte general compression header that is attributed to layer 2 for more accurate accounting when considering header savings.

Table V shows an uncompressed IPv4 header:

TABLE V

| Version/Len | TOS | Packet Length |
|---|---|---|
| | Id | Fragment Flags/Offset |
| TTL | Protocol | Checksum |
| | Source Address | |
| | Destination Address | |

With respect to the IPv4 header of Table V above, the version/length field may include values that can range from 0x45 to 0x4F. The "4" in the upper 4 bits is muted, but the lower 4 bits are retained to denote IP header size.

The packet length is simply the sum of the IPv4 header plus the payload. During the compression phase, all trailing Ethernet data is pruned, and only the IP datagram is transmitted. Thus, "Packet Length" can always be derived from the physical packet length and may therefore be compressed.

Most packets are not fragmented, so in most cased the Fragment Flags/Offset field can be compressed down to two bits (one bit to signal that the packet is not fragmented and the other for the "DF" bit). If the packet is fragmented, then these two bytes are sent uncompressed.

Most packets do not vary the TTL field, and as they tend to travel the same path, they tend to maintain a constant TTL (applications like "trace route" rely on this behavior). When the TTL is unchanged from the original compression context value, this field is compressed down to a bit. Otherwise, the field is sent verbatim.

The IP packet checksum is validated on the near end, before compression. When the checksum is valid, it is purged from the compressed packet and reconstituted on the far end. When the checksum is invalid, the packet is considered an error and either dropped or transmitted entirely uncompressed, according to configuration.

In sum, the field of an IPv4 header that is either required or opaque, and which is included verbatim in the compressed packet includes the ID field. Fields that are required to be transmitted in the compressed header under special circumstances include: version/length, fragment flags/offset, and TTL. Fields that are constant for a given session and thus do not need to be in the compressed version of the packet include: TOS, Protocol, Source Address, and Destination Address. Fields that may be reconstituted on the peer side and therefore are fully muted from the compressed packet include: Packet Length and Checksum.

The compressed header is a concatenation of variable length sub-headers. To save space, four additional extension flags associated with the packet can be applied to each header, allowing it to optionally expand. The extension flags are generic and have different meaning based on which base headers are employed. For simplicity they are called ExtHdr0 through ExtHdr3. The most common packets will use the standard size. All compressed packets consist of a L2, L3, and L4 compressed header. These three headers comprise the entire compressed data.

Based on the foregoing, a description of a compressed IPv4 header is shown in Table VI below:

TABLE VI

| Byte Width | Conditional | Bit Field | Usage |
|---|---|---|---|
| 1 | — | 7 | DF flag |
| | | 6:4 | reserved |
| | | 3:0 | IPv4 Header Size |
| 2 | — | 15:0 | Ip Id Field |
| 1 | ExtHdr0 (ttl variance) | 7:0 | Ip TTL Field |
| 2 | ExtHdr1 (fragmented) | 15:0 | IP Fragment Offset Field |

Table VII shows an uncompressed IPv6 header:

TABLE VII

| 6 | TC | Flow Label | |
| Payload Length | | Next Header | Hop Limit |
| Source Address | | | |
| Destination Address | | | |

The payload length is simply the sum of the IPv6 optional headers plus the payload. During the compression phase, all trailing Ethernet data is pruned, and only the IP datagram is transmitted. If optional headers are present, their length is transmitted via a 4-bit code (in units of 8 bytes). Thus, "Payload Length" may be derived on the far end.

Normally, the next header field would point to an expected protocol (like AH or ESP), but it is possible that it may point to optional headers (just like an IPv4 packet can have options). Optional headers are limited to those types supported by the implementation, e.g., which consists of the standard "non-fragmentable" set. Classification (and compression) halts when the first "expected" header type occurs. It is this header code that is considered to be the "constant" part of the header. Examples of "expected" headers include TCP, UDP, AH, and ESP.

Most packets do not vary the Hop Limit field, and as they tend to travel the same path, they tend to maintain a constant Hop Limit. When the Hop Limit is unchanged from the original compression context value, this field is compressed down to a bit. Otherwise the field is sent verbatim.

In sum, fields of an IPv6 header that are required to be transmitted in the compressed header under special circumstances include: Next Header and Hop Limit. Fields that are constant for a given session and thus do not need to be in the compressed version of the packet include: TC, Flow Label, Source Address, and Destination Address. Fields that may be reconstituted on the peer side and are fully muted from the compressed packet include version ("6") and Payload Length.

A description of a compressed IPv6 header is shown in Table VIII below:

TABLE VIII

| Byte Width | Conditional | Bit Field | Usage |
|---|---|---|---|
| 1 | ExtHdr0 (hop variance) | 7:0 | Ip Hop Limit Field |
| 1 | ExtHdr1 (optional headers) | 7:4 | reserved |
| | | 3:0 | Size of additional IPv6 options in units of 8 bytes |
| 1 | ExtHdr1 (optional headers) | 7:0 | New "next header" field for IPv6 (determined by the first option header) |

Table IX shows an uncompressed IP Authentication (AH) header:

TABLE IX

| Next Header | Payload Length |
| SPI | |
| Sequence Number | |
| ICV | |

The AH header contains multiple fields that may be compressed. For example, the next header field may be defined as constant, if we assume that we are only interested in one type of packet being authenticated, but for the byte it would save, it is not compressed in favor of making the session more generic (able to handle any underlying protocol).

The payload length field may be compressed down to 4 bits while still being able to convey a header with up to a 48 byte ICV. The length of AH header in 4-octet units, minus 2 (a value of 0 means 8 octets, 1 means 12 octets, etc.). In an implementation where each compressed header is byte aligned, the 4 bits potentially saved cannot be leveraged.

The sequence number field may be compressed down to about 12 bits as it is well known to increment by 1 for every packet, but doing so violates one of the compression design goals, which is to use a static compression context. The potential 3-byte savings (when combined with payload length compression) is not sufficient to justify a significant jump in compression complexity.

In sum, fields of an AH header that are either required or opaque, and which are included verbatim in the compressed packet include: next header, payload length, sequence number, and ICV. The field that is constant for a given session and thus does not need to be in the compressed version of the packet includes the SPI field.

A description of a compressed AH header is shown in Table X below:

TABLE X

| Byte Width | Conditional | Bit Field | Usage |
|---|---|---|---|
| 1 | — | 7:0 | AH next header field |
| 1 | — | 7:0 | AH payload length field |
| 4 | — | 31:0 | ESP sequence field |

Table XI shows an uncompressed ESP header:

TABLE XI

SPI
Sequence Number
Payload
    Pad Length    Next Header
ICV

The sequence number field may be compressed down to about 12 bits as it is well known to increment by 1 for every packet, but this is not done for the same reason given above. Plus in this case, doing so would only save 2 bytes.

In sum, fields of an ESP header that are either required or opaque, and which are included verbatim in the compressed packet include: sequence number, payload, pad length, next header, and ICV. The field that is constant for a given session and thus does not need to be in the compressed version of the packet includes the SPI field.

A description of a compressed ESP header is shown in Table XII below:

TABLE XII

| Byte Width | Conditional | Bit Field | Usage |
|---|---|---|---|
| 4 | — | 31:0 | ESP sequence field |

Referring back to FIG. 1, in some embodiments, any packet leaves compressor 106 in one of the four modes, with an optional ACK tag, as shown in Table XIII:

TABLE XIII

| Header Mode | Packet type | Header size (bytes) |
|---|---|---|
| 0 | Peer control packet | 1 |
| 1 | Uncompressed packet | 1 |
| 2 | Compressed packet | 2 |
| 3 | Uncompressed Packet with Compression Tag | 2 |

When sending an ACK to a remote compression engine, decompression engine 111 appends an "ACK record" to any packet issued by the local compression engine. The ACK-bearing packet can be any packet in any of the above modes. Hence, for any of the above modes, an ACK record would add an additional two bytes.

Every packet that passes through compression engine 106 leaves with a new common header, shown below in Table XIV. This header is added regardless as to if the packet has been compressed or not. The header varies in size, and can be one to four bytes in length, depending on the mode and whether an ACK record is appended to the packet or not. The AckRecord flag in the 1st byte of the common header specifies if the 2-byte ACK record is included in the header or not. Note the ACK serial number is for telling compressor 106 that decompressor 111 has seen the context request, while the compression context serial number in an uncompressed packet with compression tag is for the compression context of the bearing packet.

TABLE XIV

| Byte Width | Conditional | Bit Field | Usage |
|---|---|---|---|
| 1 | — | 7:6 | Header Mode |
|   |   |   | 0: Peer control packet |
|   |   |   | 1: Uncompressed Packet |
|   |   |   | 2: Compressed packet |
|   |   |   | 3: Uncompressed Packet with Compression Tag |
|   |   | 5 | AckRecord flag |
|   |   | 4:0 | Varies by Header Mode |
| 1 | Modes 2 and 3 | 7:0 | 8-bit Compression Session Context Index |
| 2 | AckRecord set | 15:12 | reserved |
|   |   | 11:9 | ACK Session Context Index Serial Number |
|   |   | 8 | reserved for ACK Session Context Index expansion |
|   |   | 7:0 | 8-bit ACK Session Context Index |

Table XV defines the first byte of the common packet header for a mode 0 packet. A mode 0 packet is a control packet for transmission to the peer host CPU 104 This packet can be used to send a message to the peer packet processor. As such the header compression engine also provides means for routing packets to/from the peer host.

TABLE XV

| Byte Width | Conditional | Bit Field | Usage |
|---|---|---|---|
| 1 | — | 7:6 | Header Type = 0 (Peer control packet) |
|   |   | 5 | AckRecord flag |
|   |   | 4:0 | reserved |

Table XVI defines the first byte of the common packet header for a mode 1 packet. A mode 1 packet is a standard bridged packet in uncompressed format.

TABLE XVI

| Byte Width | Conditional | Bit Field | Usage |
|---|---|---|---|
| 1 | — | 7:6 | Header Type = 1 (Uncompressed packet) |
|  |  | 5 | AckRecord flag |
|  |  | 4:0 | reserved |

Table XVII defines the first byte of the common packet header for a mode 2 packet. A mode 2 packet is a standard packet where header compression has been applied. More information about extended header flags is provided below.

TABLE XVII

| Byte Width | Conditional | Bit Field | Usage |
|---|---|---|---|
| 1 | — | 7:6 | Header Type = 2 (Compressed packet) |
|  |  | 5 | AckRecord flag |
|  |  | 4 | Extended header flag 0 (ExtHdr0) |
|  |  | 3 | Extended header flag 1 (ExtHdr1) |
|  |  | 2 | Extended header flag 2 (ExtHdr2) |
|  |  | 1 | Extended header flag 3 (ExtHdr3) |
|  |  | 0 | reserved for Session Context Index expansion |

Table XVIII defines the first byte of the common packet header for a mode 3 packet. A mode 3 packet is an uncompressed packet, but which also contains a compression context request tag. This tag is used to request that the peer device build a compression context and then ACK the compression tag in a later packet.

TABLE XVIII

| Byte Width | Conditional | Bit Field | Usage |
|---|---|---|---|
| 1 | — | 7:6 | Header Type = 3 (Compressed packet) |
|  |  | 5:4 | Compression Depth 0: L2 (Ethernet) Only 1: Up to L3 (IPv4 or IPv6) 2: Up to L4 (AH, ESP, TCP, UDP) 3: reserved |
|  |  | 3:1 | Session Context Index Serial Number |
|  |  | 0 | reserved for Session Context Index expansion |

Before entering compression engine 106, ingress packets are parsed by block 108 and potentially detected as belonging to a pre-defined compression flow. An external entity may configure classifier 105 to build and include protocol specific information shown in Table XIX below on all ingress packets. Such information carried over from classifier 105 alleviates the need to reparse the packet. Packets without any protocol specific information may be converted to Mode 0 (Peer Control Packets) by the compression firmware. Such method also provides an on-the fly packet-driven session management method, thus removing the need to configure sessions explicitly from an external master. On the compressor side, compression sessions are tracked through the Synchronization Tracking Record.

TABLE XIX

| Byte Width | Bit Field | Name | Usage |
|---|---|---|---|
| 2 | 15 | fNoMatch | When set, there is no compression session |
|  | 14:12 | SerialNumber | Serial number (0-7) for synchronization tracking |
|  | 11:0 | SessionIndex | Compression Session Index |
| 1 | 7:2 |  | reserved |
|  | 1 | fIpFrag | Packet is IP fragmented |
|  | 0 | fIpOptions | Packet contains IP options or optional headers |
| 1 | 7:0 | TTL | IPv4 TTL or IPv6 Hop Limit (or NULL) |
| 1 | 7:0 | L3Type | Layer 3 header type (IPv4/IPv6/etc) 0: Unused 1: IPv4 2: IPv6 |
| 1 | 7:0 | L4Type | Layer 4 header type (AH/ESP/etc) 0: Unused 1: AH 2: ESP |
| 1 | 7:0 | L3Offset | Offset to L3 |
| 1 | 7:0 | L4Offset | Offset to L4 |

The most difficult part of the compression system is the construction and synchronization of the compression contexts. It must be done in such a way as not to impact the performance of non-compressed packets. This is critical because the system may have a relatively low ratio of compressed to non-compressed packets in flight.

Of the two operations, compress and decompress, the decompress side is significantly simpler. This is due to additional work on the compress side to protect the decompress operation. In essence, the decompress context records are entirely stateless. They are constructed on request from the compress engine on the peer, and are not torn down. The compress side is charged with maintaining synchronization.

The compression context record is constructed on the decompress engine to assist in the decompress process. It contains information about the packet being compressed and is constructed by parsing a non-compressed packet belonging to the same compression session, as shown in Table XX:

TABLE XX

| Byte Width | Bit Field | Usage |
|---|---|---|
| 0 | L3Type | Layer 3 header type (IPv4/IPv6/etc) 0: Unused 1: IPv4 2: IPv6 |
| 1 | L4Type | Layer 4 header type (AH/ESP/etc) 0: Unused 1: AH 2: ESP |
| 2 | L2Size | Byte length of static L2 header |
| 3 | L3Size | Byte length of static L3 base header |
| 4 | L4Size | Byte length of static L4 base header |
| 5 | L2SizeOffset | Offset to 16-bit L2 field to patch for packet size (0 = Unused) |
| 6 | L2SizeDelta | Amount to add to unframed L3 packet size to get L2 patch value |
| 7-15 | reserved | — |

FIG. 6 is flowchart of a method for decompressing a packet header. In some embodiments, method 600 may be performed, at least in part, by decompression engine 111 of FIG. 11. Particularly, method 600 begins by receiving a packet at block 601. At block 602, method 600 determines whether the packet is compressed. If so, it may use a stored compression context at block 603 to decompress the packet and deliver the decompressed packet to its destination at block 604, prior to ending at block 605.

Conversely, if block 602 determines that the packet is not compressed, then block 606 determines whether there the packet includes a compression tag. If not, then method 600 delivers the uncompressed packet at block 609, and the method again ends at block 605. Otherwise, if a compression tag is present, block 607 parses the packet and builds a compression context corresponding to the packet's packet flow or session, and posts and acknowledgement message in a mailbox of compress engine 106, prior to delivering the uncompressed packet at block 609 and ending the method at block 605.

Still referring to method 600, operations 603 and 607 may require contention protection. In this case, it is important that one of the cores of cluster 204 does not build a compression context while another is attempting to use the same context to decompress a packet.

In some embodiments, the particular implementation for avoiding contention in any system may be application specific. Here, the two basic operations "use compression context" 603 and "build compression context" 607 both require a significant amount of time. This time is on the order of an entire pipe stage (400 ns), so locking the context during use with a semaphore is not practical. Also, in this case, the time during which a compression context is used is not deterministic because of how the hardware works in the CDE engine, further complicating a semaphore based approach. Finally, it is generally not acceptable to have a compression context being altered at any time near when the context is being used. For example, it is not acceptable for a compressed packet with serial number "4" to arrive at the decompress engine after the context has been destroyed in favor of a packet with serial number "5"—even with semaphore protection. Detecting and handling this case is more difficult and would require the serial number to be included in every packet (not just in the request and acknowledgements).

To avoid contention on decompress engine 111, the contentious events are not allowed to occur. This is implemented in compression engine 106. For example, a packet with a compression context request using serial number "5" is not allowed to occur at any time near when a compressed packet using serial number "4" is transmitted. This may be achieved by inserting a significant guard period around compression index changes that is well above the average packet transmission time in the system. The guard period is designed to insert latency into the context construction process only when swapping out active sessions. It does not affect the latency of creating new sessions or timing out disused sessions.

As a final note, it may be initially unclear as to why the "Post pending ACK message in mailbox of Compress Engine" operation 608 is not marked as contentious. This is because for every processing core in the decompress engine, there is an associated core in the compress engine. Thus, every decompress engine core may have a private mailbox to an associated compress engine core, eliminating any potential contention with other cores.

FIG. 7 is flowchart of a method for compressing a packet header. In some embodiments, method 700 may be performed, at least in part, by compression engine 106 of FIG. 11. Particularly, method 700 begins by receiving a packet at block 701. Block 702 determines whether a session match flag is set. If not, block 712 sends an uncompressed packet and method 700 ends at block 710. Otherwise block 703 determines whether the session is valid. If not, block 711 sets a valid update serial number state to needing an acknowledgement. Otherwise, if block 703 determines that the session is valid, then block 704 determines whether the packet's serial number is new. If so, control is passed to block 711. If not, block 705 determines whether the packet's serial number is old, in which case control passes again to block 712 and method 700 ends at block 710.

If block 705 determines that the packer's serial number is not old, then block 706 determines whether the packet's state indicates compression. If so, block 713 resets a timer, block 714 sends a compressed packet, and method 700 ends at block 710. If the packet's state does not indicate compression and/or after the operations of block 711, block 707 determines whether the timer has expired. If not, then block 715 sends an uncompressed packet, and method 700 ends at block 710. If so, block 708 resets the timer, block 709 sends an uncompressed packet with a compress request, and method 700 ends at block 710.

Still referring to method 700, if the compression session index of the packet matches either an inactive context index or a context index with a new (higher modulo 8) serial number, it will cause the creation of a new compression context. The compression context is not built on the compress engine. The engine sends a compression request to the peer decompress engine to build the context for the remote environment. The compress engine uses a Synchronization Tracking Record to track the state of the compression context on the remote peer.

There is a timer configured to control when a new compression request can be sent based on the time from which the same session index was used to transmit either a compression request or a compressed packet. This timer controls the guard period discussed previously to prevent the same session index from being actively used around the same time that it is being altered. It should be noted that such a timer addresses two issues: 1) the guard period to avoid contention at the decompressor 2) the ACK response time out. These two purposes can be addressed by different timer values.

The only contention in method 700 occurs when the state of a Synchronization Tracking Record shown in Table XXI below is changed. However there is no contention when updating the associated timer value, since even if multiple cores were to write it, the value written always reflects the current time.

TABLE XXI

| Byte Width | Bit Field | Name | Usage |
|---|---|---|---|
| 1 | 7 | fValid | When set, the session slot is in use (when clear, there is no valid data associated with the record) |
|  | 6 | fCompress | When set, the session is in "compress" mode |
|  | 5:3 | — | reserved |
|  | 2:0 | SerialNumber | Session Serial Number |
| 1 | 7:0 | — | reserved |
| 2 | 15:0 | Time | Time in uSec since last timer reset |

The compression status is indicated by the "fCompress" flag in the Synchronization Tracking Record. It has two states: "Compressed" and "Need ACK". FIG. 8 is a diagram of a state machine, including the fValid state machine, according to some embodiments. Specifically, the two main states of the state machine include valid session 800 and invalid session 801. Within valid session 800, when a new session is detected the states alternate between request state 802 and compressed state 803 depending upon whether a valid acknowledgement has been received and/or whether a new serial number or peer reboot event has taken place.

Before considering how to handle contention, it is useful to examine the tasks for which the contention occurs; namely local system reboot, lost link or peer reboot, and peer acknowledgement of compression request. In that regard, FIG. 9 is a flowchart of local system reboot process 900, FIG. 10 is a flowchart of lost link or peer reboot process 1000, and FIG. 11 is a flowchart of peer acknowledgement of compression request process 1100, according to some embodiments.

Local system reboot process 900 begins with local reboot message 901. Then, at block 902, for all session indices, block 903 clears a valid flag, block 904 resets the timer, and block 905 increments the session index, thus returning control to block 902. When all sessions indices have been handled, process 900 ends at block 906. Lost link or peer reboot process 1000 also begins with peer reboot message 1001. At block 1002, for all session indices, block 1003 determines whether the session is valid. If so, the state is set at block 1007 to require and acknowledgement. At block 1004, the timer is reset and block 1005 increments the session index, after which control returns to block 1002. When all sessions indices have been handled, process 1000 ends at block 1006. Peer acknowledgement of compression request process 1100 begins with a session acknowledgement message 1101. Block 1102 determines if a session is valid. If so, block 1103 determines whether the serial number is a match. If so, block 1004 sets the state to compress and process 1100 ends at block 1105. If the session is not valid at block 1102 and/or if the serial number does not match at block 1103, then process 1100 also ends at block 1105.

Among processes 900-1100, only peer acknowledgement process 1100 would occur during normal operation. Either of the reboot procedures 900 and 1000 may be handled in isolation. Note also that peer acknowledgement process 1100 is performed by decompress engine 111, since the ACK tags are appended to packet transmitted by the peer. This does not introduce much complexity other than that the decompress engine cores must have access to the same context avoidance strategy as the compress engine cores.

Accessing a semaphore and re-reading the Synchronization Tracking Record to get a protected copy may take on the order of 20 to 24 cycles, where sending a message would only take on the order of 6 cycles. For example, consider FIG. 12 and its alternative method for compressing a packet header, according to some embodiments. In this case, blocks 1201-1210 and 1212-1215 are the same as blocks 701-710 and 712-715, respectively. In contrast with the operations of block 711, however, here block 1211 sends a "new session" message in response to the session being invalid at block 1203 or the packet serial number being new at block 1204.

In this alternate flow, compress engine 106 may send a message to a central message handler (e.g., in header compression manager 104) to process a new session. This prevents the new session from being used immediately, but greatly simplifies the compression flow. There exists a single PDSP core (without CDE) to handle messages from up to 16 other cores. The messages processed include the three previously depicted, plus the "New Session" message implied the above flow.

FIG. 13 is a flowchart for new session message handling method 1300 according to some embodiments. At block 1301, method 1300 receives a new session message. At block 1302, method 1300 determines if the session is valid. At block 1303, method 1300 determines whether the message's serial number is older. If so, method 1300 ends at block 1305. Otherwise, block 1304 sets a valid update serial number state to require and acknowledgement, and then method 1300 ends at block 1305.

In some implementations, having a single core handle all operations dealing with synchronization records, contention is entirely avoided. For example, having 16 private mailboxes on this one core allows up to 8 compress engine cores and 8 decompress engine cores each to have a private mailbox, again avoiding contention. This one core is charged with handling up to 16 messages every 140 cycles, which is not realistic but in practical terms, should not occur and messages are only sent for compression session creation. The actual number of messages will be a small fraction of each packet processed. In addition, as this single core will not need to worry about contention, the work involved in message handling is reduced.

In certain embodiments, one or more of the techniques described above may be executed, at least in part, by one or more communication devices and/or computer systems. One such communication device or computer system is illustrated in FIG. 14. In various embodiments, system 1400 may be implemented as a server, a gateway, a router, a modem (e.g., a wireless backhaul modem), a network bridge, a switch, a hub, a repeater, or the like. In different embodiments, these various systems may be configured to communicate with each other in any suitable way, such as, for example, via a network or the like.

As illustrated, system 1400 includes one or more processor(s) 1410A-N coupled to a system memory 1420 via an input/output (I/O) interface 1430. Computer system 1400 further includes a network interface 1440 coupled to I/O interface 1430, and one or more input/output devices 1425, such as cursor control device 1460, keyboard 1470, display(s) 1480, and/or mobile device 1490. In various embodiments, computer system 1400 may be a single-processor system including one processor 1410, or a multi-processor system including two or more processor(s) 1410A-N (e.g., two, four, eight, or another suitable number). Processor(s) 1410A-N may be any processor capable of executing program instructions. For example, in various embodiments, processor(s) 1410A-N may be general-purpose or embedded processors implementing any of a variety of instruction set architectures (ISAs), such as the x86, POWERPC®, ARM®, SPARC®, or MIPS® ISAs, or any other suitable ISA. In multi-processor systems, each of processors 1410A-N may commonly, but not necessarily, implement the same ISA. Also, in some embodiments, at least one processor 1410A-N may be a graphics processing unit (GPU) or other dedicated graphics-rendering device.

System memory 1420 may be configured to store program instructions and/or data accessible by processor(s) 1410A-N. In various embodiments, system memory 1420 may be implemented using any suitable memory technology, such as static random access memory (SRAM), synchronous dynamic RAM (SDRAM), nonvolatile/Flash-type memory, or any other type of memory. As illustrated, program instructions and data implementing certain operations such as, for example, those described in the figures above, may be stored within system memory 1420 as program instructions 1425 and data storage 1435, respectively. In other embodiments, program instructions and/or data may be received, sent or stored upon different types of computer-accessible media or on similar media separate from system memory 1420 or computer system 1400. Generally speaking, a computer-accessible medium may include any tangible storage media or memory media such as magnetic or optical media—e.g., disk or CD/DVD-ROM coupled to computer system 1400 via I/O interface 1430. Program instructions and data stored on a tangible computer-accessible medium in non-transitory form may further be transmitted by transmission media or signals such as electrical, electromagnetic, or digital signals, which may be conveyed via a communication medium such as a network and/or a wireless link, such as may be implemented via network interface 1440.

In an embodiment, I/O interface 1430 may be configured to coordinate I/O traffic between processor(s) 1410A-N, system memory 1420, and any peripheral devices in the device, including network interface 1440 or other peripheral interfaces, such as input/output devices 1450. In some embodiments, I/O interface 1430 may perform any necessary protocol, timing or other data transformations to convert data signals from one component (e.g., system memory 1420) into a format suitable for use by another component (e.g., processor(s) 1410A-N). In some embodiments, I/O interface 1430 may include support for devices attached through various types of peripheral buses, such as a variant of the Peripheral Component Interconnect (PCI) bus standard or the Universal Serial Bus (USB) standard, for example. In some embodiments, the function of I/O interface 1430 may be split into two or more separate components, such as a north bridge and a south bridge, for example. In addition, in some embodiments some or all of the functionality of I/O interface 1430, such as an interface to system memory 1420, may be incorporated directly into processor(s) 1410A-N.

Network interface 1440 may be configured to allow data to be exchanged between computer system 1400 and other devices attached to a network, such as other computer systems, or between nodes of computer system 1400. In various embodiments, network interface 1440 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1450 may, in some embodiments, include one or more display terminals, keyboards, keypads, touchpads, scanning devices, voice or optical recognition devices, mobile devices, or any other devices suitable for entering or retrieving data by one or more computer system 1400. Multiple input/output devices 1450 may be present in computer system 1400 or may be distributed on various nodes of computer system 1400. In some embodiments, similar input/output devices may be separate from computer system 1400 and may interact with one or more nodes of computer system 1400 through a wired or wireless connection, such as over network interface 1440.

As shown in FIG. 14, memory 1420 may include program instructions 1425 configured to implement certain embodiments described herein, and data storage 1435 comprising various data accessible by program instructions 1425. In an embodiment, program instructions 1425 may include software elements of embodiments illustrated in the above figures. For example, program instructions 1425 may be implemented in various embodiments using any desired programming language, scripting language, or combination of programming languages and/or scripting languages (e.g., C, C++, C#, JAVA®, JAVASCRIPT®, PERL®, etc.). Data storage 1435 may include data that may be used in these embodiments (e.g., recorded communications, profiles for different modes of operations, etc.). In other embodiments, other or different software elements and data may be included.

A person of ordinary skill in the art will appreciate that computer system 1400 is merely illustrative and is not intended to limit the scope of the disclosure described herein. In particular, the computer system and devices may include any combination of hardware or software that can perform the indicated operations. In addition, the operations performed by the illustrated components may, in some embodiments, be performed by fewer components or distributed across additional components. Similarly, in other embodiments, the operations of some of the illustrated components may not be provided and/or other additional operations may be available. Accordingly, systems and methods described herein may be implemented or executed with other computer system configurations.

It will be understood that various operations discussed herein may be executed simultaneously and/or sequentially. It will be further understood that each operation may be performed in any order and may be performed once or repetitiously. In various embodiments, the operations discussed herein may represent sets of software routines, logic functions, and/or data structures that are configured to perform specified operations. Although certain operations may be shown as distinct logical blocks, in some embodiments at least some of these operations may be combined into fewer blocks. Conversely, any given one of the blocks shown herein may be implemented such that its operations may be divided among two or more logical blocks. Moreover, although shown with a particular configuration, in other embodiments these various modules may be rearranged in other suitable ways.

Many of the operations described herein may be implemented in hardware, software, and/or firmware, and/or any combination thereof. When implemented in software, code segments perform the necessary tasks or operations. The program or code segments may be stored in a processor-readable, computer-readable, or machine-readable medium. The processor-readable, computer-readable, or machine-readable medium may include any device or medium that can store or transfer information. Examples of such a processor-readable medium include an electronic circuit, a semiconductor memory device, a flash memory, a ROM, an erasable ROM (EROM), a floppy diskette, a compact disk, an optical disk, a hard disk, a fiber optic medium, etc. Software code segments may be stored in any volatile or non-volatile storage device, such as a hard drive, flash memory, solid state memory, optical disk, CD, DVD, computer program product, or other memory device, that provides tangible computer-readable or machine-readable storage for a processor or a middleware container service. In other embodiments, the memory may be a virtualization of several physical storage devices, wherein the physical storage devices are of the same or different kinds. The code segments may be downloaded or transferred from storage to a processor or container via an internal bus, another computer network, such as the Internet or an intranet, or via other wired or wireless networks.

Many modifications and other embodiments of the invention(s) will come to mind to one skilled in the art to which the invention(s) pertain having the benefit of the teachings presented in the foregoing descriptions, and the associated drawings. Therefore, it is to be understood that the invention(s) are not to be limited to the specific embodiments disclosed. Although specific terms are employed herein, they are used in a generic and descriptive sense only and not for purposes of limitation.

The invention claimed is:

1. A method, comprising:
   receiving an ingress packet at a backhaul modem from an Ethernet switch, the packet having an uncompressed header and a payload, wherein the uncompressed header comprises a plurality of network protocol sub-headers;
   parsing the uncompressed header for the first portion of the plurality of sub-headers into a plurality of fields, the plurality of fields including a static field and a derivable field;
   removing the static field and the derivable field from the first portion of sub-headers from the uncompressed header;
   adding one or more compressed fields to the uncompressed header to create a compressed header, wherein a compressed field is added for each sub-header of the first portion of sub-headers; and
   transmitting the packet with the compressed header and the payload via a wireless link.

2. The method of claim 1, wherein the static field includes at least one of: a source IP address, a destination IP address, or a Media Access Control (MAC) address.

3. The method of claim 1, wherein the derivable field includes at least one of: checksum field or a length field.

4. The method of claim 1, further comprising:
   adding a common header to the compressed header, the common header configured to identify each transmitted packet as a peer control packet, an uncompressed packet, a compressed packet, or an uncompressed packet with a compression tag.

5. The method of claim 4, wherein the common header includes a session index.

6. The method of claim 5, wherein the session index is configured to identify one of a plurality of different packet flows.

7. The method of claim 4, wherein the common header identifies the packet as an uncompressed packet with a compression tag, and wherein the common header is configured to signal a request to another backhaul modem to create a new decompression session based upon the packet.

8. The method of claim 7, wherein the common header includes a session index, a serial number, and a depth indicator.

9. The method of claim 8, wherein the serial number allows the other backhaul modem to reconfigure a session index with a different packet flow than a current packet flow.

10. The method of claim 9, further comprising receiving the session index and the serial number from the other backhaul modem as part of an acknowledgment message.

11. The method of claim 8, wherein the depth indicator is configured to convey a compression depth, the compression depth indicating the network protocol layers that will comprise the first portion of the plurality of sub-headers.

12. The method of claim 11, wherein the depth indicator is configured to enable the other backhaul modem to create a compression context at a selected compression depth.

13. The method of claim 1, further comprising:
   identifying the packet as belonging to a packet flow that is a candidate for compression and for which a corresponding compression context already exists; and
   retrieving the compressed header associated with the corresponding compression context.

14. The method of claim 1, further comprising:
   identifying the packet as belonging to a packet flow that is a candidate for compression but for which a corresponding compression context does not yet exist; and
   creating the compression context for the packet flow, wherein the corresponding compression context includes the static field and an indication of the derivable field, and wherein the corresponding compression context is associated with the compressed header.

15. The method of claim 1, further comprising:
   receiving the packet over the wireless link with the compressed header and the payload;
   identifying one of a plurality of compression contexts that corresponds to the compressed header;
   retrieving the static field and computing the derivable field associated with the corresponding compression context; and
   replacing the compressed header with the static field and the derivable field to reconstruct the uncompressed packet.

16. A backhaul modem, comprising:
   a processor; and
   a memory coupled to the processor, the memory configured to store program instructions executable by the processor to cause the device to:
      receive an ingress packet from an Ethernet switch, wherein the packet includes an uncompressed header, and wherein the packet belongs to a given one of a plurality of different packet flows, and wherein the uncompressed header comprises a plurality of network protocol sub-headers;
      add a context create tag to the packet to create a tagged packet in response to a determination that the given packet flow is suitable for compression, wherein the context create tag includes a depth indicator that indicates a portion of the network protocol sub-headers that will be compressed;
      transmit the tagged packet to a receiver device via a wireless link;
      receive an acknowledgment from the receiver device via the wireless link, wherein the acknowledgement indicates that the receiver device has built a compression context associated with the given packet flow in response to having received the tagged packet, wherein the compression context is configured by the receiver device to process a compressed header that includes a number of compressed fields corresponding to the depth indicator; and
      transmit a subsequent packet of the given packet flow to the receiver device, wherein the subsequent packet includes a compressed header that includes a number of compressed fields corresponding to the depth indicator.

17. The backhaul modem of claim 16, wherein the packet is an Ethernet packet having a static field and a derivable field, wherein the subsequent packet in the compressed state does not have the static field or the derivable field, wherein the static field includes at least one of: a source Internet Protocol (IP) address, a destination IP address, or a Media Access Control (MAC) address, wherein the derivable field includes at least one of: a checksum field or an Ethertype field, and wherein the compression context includes the static field and an indication of the derivable field.

18. The backhaul modem of claim 17, wherein the context create tag further includes a session index, and a serial number, wherein the session index is configured to identify the given one of the plurality of different packet flows, and wherein the serial number is usable to reconfigure sequentially the same session index with different packet flows.

19. The backhaul modem of claim 16, wherein the program instructions are executable by the processor to further cause the device to transmit another packet belonging to the given packet flow to the receiver device in an uncompressed state prior to having received the acknowledgement.

20. A non-transitory electronic storage medium having program instructions stored thereon that, upon execution by a processor of a device, cause the device to:

receive a packet from a backhaul modem device via a wireless backhaul link, wherein the packet belongs to a given one of a plurality of different packet flows suitable for compression, wherein the packet includes an uncompressed header, wherein the uncompressed header comprises a plurality of network protocol sub-headers, and wherein the packet is an Ethernet packet having a static field and a derivable field, wherein the static field includes at least one of: a source Internet Protocol (IP) address, a destination IP address, or a Media Access Control (MAC) address, wherein the derivable field includes at least one of: a checksum field or an Ethertype field, and wherein the packet includes a context create tag wherein the context create tag includes a depth indicator that indicates a portion of the network protocol sub-headers that will be compressed;

create a compression context associated with the given packet flow in response to the context create tag, wherein the compression context includes the static field and an indication of the derivable field, wherein the compression context is configured to process a compressed header that includes a number of compressed sub-headers corresponding to the depth indicator;

transmit an acknowledgment to the backhaul modem, wherein the acknowledgement is configured to indicate that the compression context has been built; and receive a subsequent packet of the given packet flow in a compressed state, wherein the subsequent packet in the compressed state does not have the static field or the derivable field, and wherein the subsequent packet includes a compressed header that includes a number of compressed sub-headers corresponding to the depth indicator.

* * * * *